(12) United States Patent
Altman (10) Patent No.: US 8,787,966 B2
(45) Date of Patent: Jul. 22, 2014

(54) MULTI-MODEM COMMUNICATION USING VIRTUAL IDENTITY MODULES

(71) Applicant: Liveu Ltd., Kfar Saba (IL)

(72) Inventor: Baruch Yosef Altman, Pardes Hanna (IL)

(73) Assignee: Liveu Ltd., Kfar Saba (IL)

( * ) Notice: Subject to any disclaimer, the term of this patent is extended or adjusted under 35 U.S.C. 154(b) by 0 days.

(21) Appl. No.: 13/921,227

(22) Filed: Jun. 19, 2013

(65) Prior Publication Data

US 2013/0310108 A1      Nov. 21, 2013

Related U.S. Application Data

(63) Continuation of application No. PCT/IB2013/053843, filed on May 12, 2013.

(60) Provisional application No. 61/648,091, filed on May 17, 2012.

(51) Int. Cl.
*H04M 1/00*          (2006.01)
*H04W 8/08*          (2009.01)

(52) U.S. Cl.
CPC ..................... *H04W 8/08* (2013.01)
USPC .......... 455/552.1; 455/436; 370/328

(58) Field of Classification Search
CPC ............................. H04W 84/00; H04W 8/00
USPC .............................................. 455/552.1, 558
See application file for complete search history.

(56) References Cited

U.S. PATENT DOCUMENTS

| | | |
|---|---|---|
| 5,280,470 A | 1/1994 | Buhrke et al. |
| 5,771,229 A | 6/1998 | Gavrilovich |
| 6,253,247 B1 | 6/2001 | Bhaskar et al. |
| 6,288,753 B1 | 9/2001 | DeNicola et al. |
| 6,496,477 B1 | 12/2002 | Perkins |
| 6,510,553 B1 | 1/2003 | Hazra |
| 6,647,015 B2 | 11/2003 | Malkemes et al. |
| 6,754,872 B2 | 6/2004 | Zhang et al. |
| 6,757,256 B1 | 6/2004 | Anadakumar et al. |
| 6,774,926 B1 | 8/2004 | Ellis et al. |
| 6,785,330 B1 | 8/2004 | Whealton et al. |

(Continued)

FOREIGN PATENT DOCUMENTS

| | | |
|---|---|---|
| GB | 2428529 A | 1/2007 |
| JP | 2002010332 A | 1/2002 |

(Continued)

OTHER PUBLICATIONS

U.S. Appl. No. 12/863,723 Office Action dated Jun. 4, 2013.

(Continued)

*Primary Examiner* — Charles Shedrick
(74) *Attorney, Agent, or Firm* — D. Kligler IP Services Ltd.

(57) ABSTRACT

Communication apparatus (22) includes an interface (41) to a plurality of wireless modems (42) and bonding circuitry (39), which is configured to receive multiple virtual identities in the apparatus, to load respective ones of the received virtual identities into one or more of the wireless modems, and to communicate over the air by simultaneously transmitting or receiving a data stream over at least the two or more of the wireless modems. Systems and methods for such communication are provided, as well.

27 Claims, 2 Drawing Sheets

(56) References Cited

U.S. PATENT DOCUMENTS

| | | |
|---|---|---|
| 6,788,686 B1 | 9/2004 | Khotimsky et al. |
| 6,831,574 B1 | 12/2004 | Mills et al. |
| 6,842,446 B2 | 1/2005 | Everson et al. |
| 6,987,732 B2 | 1/2006 | Gracon et al. |
| 7,027,415 B1 | 4/2006 | Dahlby et al. |
| 7,039,930 B1 | 5/2006 | Goodman et al. |
| 7,082,221 B1 | 7/2006 | Jiang |
| 7,151,762 B1 | 12/2006 | Ho et al. |
| 7,218,915 B2 | 5/2007 | Craven |
| 7,237,032 B2 | 6/2007 | Gemmell |
| 7,237,033 B2 | 6/2007 | Weigand et al. |
| 7,292,571 B2 | 11/2007 | Brown |
| 7,324,491 B1 | 1/2008 | Benveniste |
| 7,542,456 B2 | 6/2009 | Garg et al. |
| 7,551,671 B2 | 6/2009 | Tyldesley et al. |
| 7,653,200 B2 | 1/2010 | Karmi et al. |
| 7,828,203 B2 | 11/2010 | Sonetaka |
| 7,894,807 B1 | 2/2011 | Drennan |
| 7,948,933 B2 | 5/2011 | Ohayon et al. |
| 8,165,044 B2 | 4/2012 | Mahajan et al. |
| 8,204,085 B1 | 6/2012 | Courtney et al. |
| 2002/0040479 A1 | 4/2002 | Ehrman et al. |
| 2002/0054578 A1 | 5/2002 | Zhang et al. |
| 2002/0143565 A1 | 10/2002 | Headings et al. |
| 2002/0146232 A1 | 10/2002 | Harradine et al. |
| 2002/0154703 A1 | 10/2002 | Kubota et al. |
| 2002/0174434 A1 | 11/2002 | Lee et al. |
| 2002/0176482 A1 | 11/2002 | Chien |
| 2003/0002577 A1 | 1/2003 | Pinder |
| 2003/0016770 A1 | 1/2003 | Trans et al. |
| 2003/0046708 A1 | 3/2003 | Jutzi |
| 2003/0051041 A1* | 3/2003 | Kalavade et al. ............. 709/229 |
| 2003/0055971 A1 | 3/2003 | Menon |
| 2003/0061503 A1* | 3/2003 | Katz et al. ..................... 713/200 |
| 2003/0074554 A1 | 4/2003 | Roach et al. |
| 2003/0081565 A1 | 5/2003 | McIntosh et al. |
| 2003/0146940 A1 | 8/2003 | Ellis et al. |
| 2003/0174733 A1 | 9/2003 | Kawai et al. |
| 2003/0190908 A1 | 10/2003 | Craven |
| 2004/0013192 A1 | 1/2004 | Kennedy |
| 2004/0025186 A1 | 2/2004 | Jennings et al. |
| 2004/0042442 A1 | 3/2004 | Pecen et al. |
| 2004/0072591 A1 | 4/2004 | Andreini |
| 2004/0098748 A1 | 5/2004 | Bo et al. |
| 2004/0133917 A1 | 7/2004 | Schilling |
| 2004/0176134 A1 | 9/2004 | Goldthwaite et al. |
| 2004/0180696 A1 | 9/2004 | Foore et al. |
| 2004/0204088 A1 | 10/2004 | Dearn |
| 2005/0041586 A1 | 2/2005 | Jiang |
| 2005/0047363 A1 | 3/2005 | Jiang |
| 2005/0105815 A1 | 5/2005 | Zhang et al. |
| 2005/0124288 A1 | 6/2005 | Karmi et al. |
| 2005/0125670 A1* | 6/2005 | Sozzani et al. ................ 713/171 |
| 2005/0265383 A1 | 12/2005 | Melpignano et al. |
| 2006/0015917 A1 | 1/2006 | Rozental |
| 2006/0015924 A1 | 1/2006 | Kortum et al. |
| 2006/0062242 A1 | 3/2006 | Dacosta |
| 2006/0062243 A1 | 3/2006 | Dacosta |
| 2006/0085551 A1 | 4/2006 | Xie et al. |
| 2006/0146831 A1 | 7/2006 | Argyropoulos et al. |
| 2006/0221846 A1 | 10/2006 | Dyck et al. |
| 2006/0264184 A1 | 11/2006 | Li et al. |
| 2007/0083899 A1 | 4/2007 | Compton et al. |
| 2007/0098007 A1 | 5/2007 | Prodan et al. |
| 2007/0121678 A1 | 5/2007 | Brooks et al. |
| 2007/0136777 A1 | 6/2007 | Hasek et al. |
| 2007/0204321 A1 | 8/2007 | Shen et al. |
| 2007/0207832 A1 | 9/2007 | Gerardi et al. |
| 2007/0247515 A1 | 10/2007 | Roman |
| 2007/0263072 A1 | 11/2007 | Lochbaum et al. |
| 2008/0020755 A1 | 1/2008 | Liu et al. |
| 2008/0025210 A1 | 1/2008 | Honary et al. |
| 2008/0034396 A1 | 2/2008 | Lev |
| 2008/0254766 A1 | 10/2008 | Craven |
| 2008/0268866 A1 | 10/2008 | Sukkarie |
| 2008/0295159 A1* | 11/2008 | Sentinelli .......................... 726/6 |
| 2008/0310371 A1* | 12/2008 | Russell ........................ 370/331 |
| 2009/0006848 A1* | 1/2009 | Adrangi et al. ............... 713/168 |
| 2009/0077643 A1 | 3/2009 | Schmidt et al. |
| 2009/0125996 A1 | 5/2009 | Guccione et al. |
| 2009/0138925 A1 | 5/2009 | Headings et al. |
| 2009/0163175 A1* | 6/2009 | Shi et al. ........................ 455/411 |
| 2009/0270129 A1* | 10/2009 | Kuo et al. ..................... 455/558 |
| 2010/0210304 A1* | 8/2010 | Huslak ........................... 455/558 |
| 2010/0227588 A1* | 9/2010 | Bradley ......................... 455/411 |
| 2010/0248690 A1* | 9/2010 | Biggs et al. ................... 455/411 |
| 2010/0273424 A1* | 10/2010 | De Petris et al. ............. 455/41.2 |
| 2010/0273452 A1 | 10/2010 | Rajann et al. |
| 2010/0299703 A1 | 11/2010 | Altman |
| 2010/0311391 A1* | 12/2010 | Siu et al. ....................... 455/411 |
| 2010/0311402 A1 | 12/2010 | Srinivasan et al. |
| 2010/0311404 A1 | 12/2010 | Shi et al. |
| 2010/0311418 A1 | 12/2010 | Shi et al. |
| 2010/0311444 A1 | 12/2010 | Shi et al. |
| 2010/0311468 A1* | 12/2010 | Shi et al. ....................... 455/558 |
| 2010/0322259 A1 | 12/2010 | Garg et al. |
| 2011/0007693 A1 | 1/2011 | Frusina et al. |
| 2011/0028135 A1* | 2/2011 | Srinivasan .................... 455/415 |
| 2011/0051642 A1 | 3/2011 | Krishnaswamy et al. |
| 2011/0059773 A1* | 3/2011 | Neumann et al. ............. 455/558 |
| 2011/0081951 A1* | 4/2011 | Hwang .......................... 455/558 |
| 2011/0115976 A1 | 5/2011 | Ohayon et al. |
| 2011/0117909 A1* | 5/2011 | Cao et al. ...................... 455/423 |
| 2011/0151858 A1* | 6/2011 | Lai ............................... 455/422.1 |
| 2011/0154460 A1* | 6/2011 | Khare et al. ...................... 726/7 |
| 2011/0269423 A1 | 11/2011 | Schell et al. |
| 2011/0269456 A1* | 11/2011 | Krishnaswamy et al. . 455/426.1 |
| 2012/0021744 A1* | 1/2012 | Chin et al. .................... 455/436 |
| 2012/0047227 A1 | 2/2012 | Haggerty et al. |
| 2012/0135715 A1* | 5/2012 | Kang et al. ................. 455/412.1 |
| 2012/0195259 A1 | 8/2012 | Ohayon et al. |
| 2013/0029720 A1* | 1/2013 | Clevorn ...................... 455/552.1 |
| 2013/0155231 A1 | 6/2013 | Ohayon et al. |
| 2013/0329639 A1* | 12/2013 | Wietfeldt et al. ............. 370/328 |

FOREIGN PATENT DOCUMENTS

| | | |
|---|---|---|
| JP | 2002344965 A | 11/2002 |
| JP | 2005065207 A | 3/2005 |
| WO | 02063501 A2 | 8/2002 |
| WO | 02089519 A1 | 11/2002 |
| WO | 03098850 A1 | 11/2003 |
| WO | 2005060300 A1 | 6/2005 |
| WO | 2005109789 A1 | 11/2005 |
| WO | 2011075739 A1 | 6/2011 |
| WO | 2012158850 A1 | 11/2012 |

OTHER PUBLICATIONS

EP Patent Application # 09704224.6 Office Action dated Nov. 17, 2011.

International Application PCT/IB2013/054551 Search Report dated Oct. 14, 2013.

International Application PCT/IB2013/053843 Search Report dated Aug. 21, 2013.

U.S. Appl. No. 13/886,050 Office Action dated Aug. 12, 2013.

U.S. Appl. No. 12/965,879 Office Action dated Aug. 29, 2013.

U.S. Appl. No. 13/368,369 Office Action dated Aug. 29, 2013.

U.S. Appl. No. 12/863,723 Final Office Action dated Nov. 1, 2013.

* cited by examiner

MULTI-MODEM COMMUNICATION USING VIRTUAL IDENTITY MODULES

CROSS-REFERENCE TO RELATED APPLICATIONS

This application claims the benefit of U.S. Provisional Patent Application 61/648,091, filed May 17, 2012, which is incorporated herein by reference.

FIELD OF THE INVENTION

The present invention relates generally to network communications, and particularly to systems and methods for communication over cellular networks and other credentials-based communication networks.

BACKGROUND

In wireless communication networks, such as cellular networks, a single communication channel may be insufficient to provide the performance required by certain users, such as sufficient bandwidth, mobility, full territorial coverage, sustainability of performance, and uplink capacity. To address this problem, U.S. Pat. No. 7,948,933, whose disclosure is incorporated herein by reference, describes a virtual broadband transmitting unit, in which a stream generator generates multiple data streams from an incoming media datastream. A transmission manager controls upload of the data streams via multiple modems over corresponding transmission channels to at least one wireless communication network (such as a cellular network). The data streams are reassembled into a single media stream at the receiver.

U.S. Patent Application Publication 2011/0269456 describes systems and methods of managing concurrent access using different network identities in a wireless apparatus with a shared baseband hardware implementation. Data obtained by concurrently utilizing the baseband device with different network identities. The identities may be associated with a physical subscriber identity module (SIM), also referred to as a "subscriber integrated module," or a virtual SIM (VSIM).

A SIM is an integrated circuit embedded on a small, removable card, which is used in most mobile telephones. The SIM contains a unique serial number and an international mobile subscriber identity (IMSI), corresponding to the telephone number, as well as codes used in security authentication and ciphering, along with other critical information. The equivalents in cellular UMTS and CDMA networks are sometimes called UICC and R-USIM, respectively. Examples of other equivalents and names of corresponding entities in other sorts of networks are ISIM (IP multimedia SIM), and USIM. SIMs may also sometimes be used in satellite networks, such as BGAN Inmarsat, Thuraya, Iridium and VSAT, as well as in some WiFi networks. A VSIM serves the same purpose as a conventional SIM card, except that the SIM card itself is held in a remote server, rather than in the mobile modem, and the corresponding identity data (including the IMSI and any security information needed for proper operation) are provided to the modem as and when required.

For example, Implementa (Hannover, Germany) provides a "Virtual SIM Platform," in which SIM cards are stored and managed in central SIM Storages and remotely utilized by mobile terminals. A single SIM card from the storages can be allocated to a mobile terminal by means of software commands. Mobile terminals with allocated Virtual SIM cards are said to behave just as if the SIM card was inserted physically in the terminal.

SUMMARY

Embodiments of the present invention that are described hereinbelow provide systems and methods for multi-channel wireless communications that take advantage of virtual identity capabilities.

There is therefore provided, in accordance with an embodiment of the present invention, communication apparatus, which includes an interface to a plurality of wireless modems. Bonding circuitry is configured to receive multiple virtual identities in the apparatus, to load respective ones of the received virtual identities into one or more of the wireless modems, and to communicate over the air by simultaneously transmitting or receiving a data stream over at least the two or more of the wireless modems.

There is also provided, in accordance with an embodiment of the present invention, A method for communication, which includes providing a bonding device that includes an interface to a plurality of wireless modems. Multiple virtual identities are received from a server to the bonding-performing device, and respective ones of the received virtual identities are loaded into two or more of the wireless modems. Communication is carried out over the air by simultaneously transmitting or receiving a data stream over at least the two or more of the wireless modems.

There is additionally provided, in accordance with an embodiment of the present invention, communication system, which includes at least one server, configured to maintain and distribute to clients multiple different virtual identities for communicating over wireless networks. At least one bonding-performing communication device includes an interface to a plurality of wireless modems and is configured to receive one or more virtual identities from the at least one server, to load respective ones of the downloaded virtual identities into a wireless modem, and to communicate over the air by simultaneously transmitting or receiving a data stream over at least the two or more of the wireless modems.

The present invention will be more fully understood from the following detailed description of the embodiments thereof, taken together with the drawings in which:

DETAILED DESCRIPTION OF EMBODIMENTS

The process of multiplexing a data stream over two or more wireless channels, served by different, respective wireless modems, is referred to herein as "bonding" of the channels. The above-mentioned U.S. Pat. No. 7,948,933 enables this sort of bonding, including bonding of channels carried by different networks; but the scheme described in this patent requires that each wireless modem have its own SIM. (The term "SIM" is used herein to refer to any and all sorts of secure hardware modules that can be inserted in a wireless modem and contain the identification information necessary for the modem to authenticate itself and operate on a given network.)

Embodiments of the present invention that are described hereinbelow provide devices, methods and systems that use VSIMs in a multi-SIM communication system, so that identities of a group of bonded modems, and thus the networks over which the modems are able to communicate, can be selected and replaced by software operations, both in advance and during operation. The term "identity" refers to the set of data—usually provided by a SIM—by which the modem identifies and authenticates itself to a network. This identity may include credentials and information for use in protocol encryption and decryption, which may be used as is or used in calculation. The identity data may be used for identification and authentication not only at session initiation, but also for ongoing communication during the session itself, in a periodic manner or in response to a network poll or inquiry.

The term "virtual identity" is used herein to refer to identity data that are provided to a communication device in electronic form rather than being hard-programmed into a physically-connected SIM card or module, such as the data provided by the sorts of virtual SIMs (VSIMs) that are mentioned above in the Background section. The provision of such a virtual identity can obviate the need for a hardware SIM in the device to provide needed identity data.

Embodiments of the present invention are applicable to substantially all uses of SIMs and equivalents, in cellular, satellite, WiFi and other networks that uses SIMs or similar physical identity mechanisms, and can therefore use VSIM, as well.

When using VSIMs in multi-SIM communication devices, optimization can be achieved as to the cost and performance of the communication in each session and overall cost and performance for service and network operators (including MVNOs, MNOs, Satcom operators, virtual identity service providers, bonding service providers, etc.) and customers, depending on multiple criteria. For example, only the necessary number of VSIMs may be used in each portion of a communication session, according to desired performance and/or quality of service (QoS), the actual performance of each VSIM in use and each additional VSIM, determined at each location and at each point in time. Such utilization and optimization may save costs to customers, network operators or both, as well as reduce the overhead and load on cellular networks. The present embodiments offer the means to perform these tasks of VSIM utilization and optimization in such multi-SIM communication system in any direction (uplink and/or downlink), especially (but not exclusively) for Internet data traffic.

In the disclosed embodiments, communication apparatus includes multiple wireless modem drivers, managers or actual modems, along with bonding circuitry, which transmits and receives data streams over any combination of the associated wireless modems at each point in time. The bonding circuitry downloads one or more virtual identities from at least one server to the apparatus, and then loads respective virtual identities into at least some of the connected wireless modems. The bonding circuitry and/or the server are thus able to select optimal identities to use in the apparatus at any point in time, based on current desired performance, current connectivity performance, and/or rules defined by business logic in order to give the desired transmission quality at minimal cost, thus optimizing cost-performance criteria. Utilization of the identities may be modified (again subject to rules of business logic), by adding, removing, and/or replacing the identities as appropriate during operation of the apparatus.

Typically, the server or servers maintain a pool of heterogeneous virtual identities having different, respective characteristics, and the virtual identities that are to be downloaded are selected based on these characteristics. The selection may be performed by the apparatus that is to receive the virtual identities or by the server, or by the two entities in concert. The downloaded virtual identities may belong to different cellular carriers on at least two different wireless networks, so that the data stream is multiplexed over these different wireless networks. Alternatively, a number of the VSIMs may belong to a single network and operator, such as in areas where there is insufficient cost/performance benefit from other operators, including (but not limited to) areas and/or times without coverage by other networks and/or operators, or when such performance is too costly, or in cases in which the single network selected is sufficient to provide the desired performance. In some cases, as described below, at least one of the modems may use an actual physical identity (SIM). Additionally or alternatively, the apparatus may access and use wireless networks of other types, such as satellite networks and/or wireless local networks.

As noted above, selection of the virtual identities to be downloaded to the apparatus typically depends on the desired performance and the qualities of services provided by the different cellular carriers in the location of the apparatus, such as the bandwidth, reliability, latency, priority, sustainability, jittery behavior, modem types, antenna support, GPS location, serving cell IDs, and/or cost of the available services, as well as user or operator preferences, commercial terms and obligations, marketing preferences, operations preferences and other business logic. These considerations may change during the session due to device mobility, interference, networks conditions, and other reasons, and the selection of VSIMs to use may change adaptively during the session, as well, as described below. Cost and tariffs taken into account in virtual identity selection may include all direct and indirectly-related charges, as well as calculated expenses. A variety of algorithms and procedures may be applied in deciding, at each point during the operation of the apparatus, how many and which virtual identities to download and use.

Figure 1:
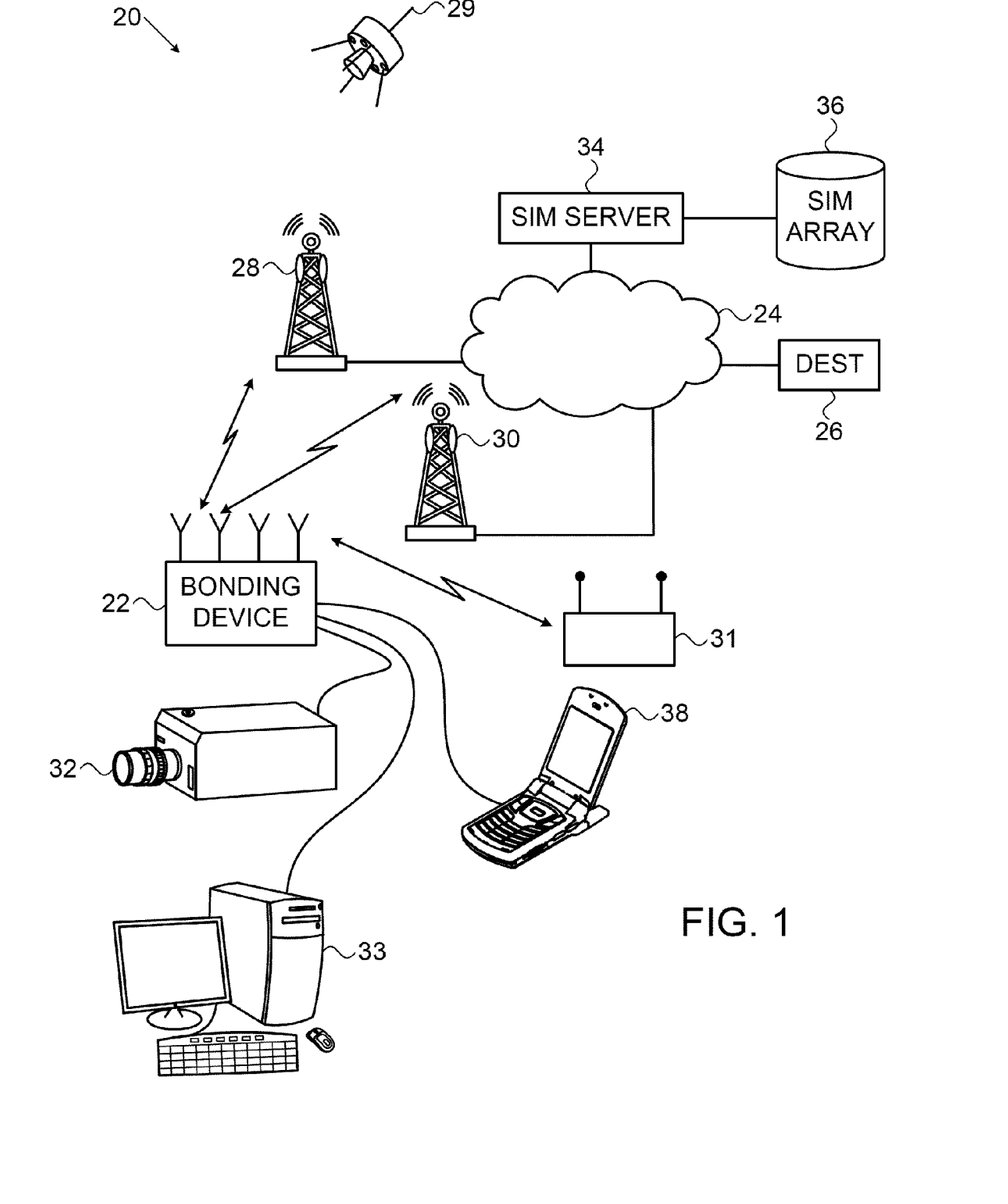
FIG. 1 is a block diagram that schematically illustrates a wireless communication system, in accordance with an embodiment of the present invention.

FIG. 1 is a block diagram that schematically illustrates a wireless communication system 20, in accordance with an embodiment of the present invention. In system 20, a bonding communication device 22 (referred to hereinafter simply as a "bonding device") communicates over a network 24 with a destination 26. Only a single bonding device and destination are shown and described here for the sake of simplicity, but in practice there are typically multiple bonding devices and multiple destinations in communication concurrently (or switching from one to another). The disclosed embodiments will relate only to transmission of data from bonding device 24 to destination 26, but in general destination 26 may also transmit over at least one wireless channel to the bonding device (and may in some applications transmit simultaneously over multiple bonded channels). Extension of the components and methods that are described hereinbelow from the single bonding device 22 to these sorts of more complex scenarios is straightforward, as will be apparent to those skilled in the art.

Although network 24 is shown in FIG. 1 as a single entity, in practice network 24 typically comprises components of multiple different, interconnected networks. Bonding device 22 transmits or receives data simultaneously over multiple, parallel wireless channels, which may be carried by two or more different cellular carriers 28, 30 (i.e., via two or more different cellular networks at the same time). (The term "simultaneously" is used in the present description and in the claims to indicate that multiple parallel connections are open for data transmission via different modems at the same time. Since the exact timing of transmission is controlled by the actual modems and networks, the actual data transmission itself may not occur at precisely the same time via the different modems. Furthermore, at various points in time, for various durations and due to various reasons, only a subset of the modems may be selected for use or actually be in use, while the others are used only minimally or not at all, or even shut down, returned to use, etc.) These cellular networks may use different technologies and standards, such as GSM, CDMA, LTE, and any other wireless communication technology with suitable data carrying capabilities, including both existing technologies and new technologies that have not yet been commercially deployed. Additionally or alternatively, one or more of modems 42 may access channels carried by networks of other types, such as wireless local area networks (WLANs) 31 and satellite networks 29, as well as wireline networks, such as via cable modems or xDSL modems, and virtual identities may be downloaded to such modems, as well (such as to a satellite or WLAN modem), to the extent required. The data transmitted by the bonding device may reach destination 26 via wired networks and/or via the same wireless networks that are directly accessed by the bonding device. Device 22 may include all or some of the modems that it uses inside, as an integral part of the device. Additionally or alternatively, device 22 may be connected to any number of such modems externally via wires or even wirelessly (such as over WiFi, Bluetooth, NFC, Zigbee or other local networks).

Hence, bonding device 22 may comprise special-purpose, dedicated hardware circuits for channel bonding, or it may perform the bonding functions described herein using standard hardware components under the control of software for this purpose, or it may use a combination of standard and special-purpose hardware and software components. In software-based implementation, bonding device 22 itself may comprise a smartphone, tablet, desktop, laptop or any other suitable general-purpose or special-purpose computing and communication device, running the appropriate software to perform the functions that are described herein. For the sake of simplicity, all of these various alternatives are referred to as bonding communication devices (or simply "bonding devices") and are represented by device 22 in the description and the drawings.

Bonding device 22 may use its bonding capabilities and the facilities of network 24 to transmit substantially any sort of data, but the large bandwidth afforded by bonding multiple channels is particularly useful in high-speed data streaming. For example, in the pictured embodiment, bonding device 22 is connected to a video camera 32 and uploads real-time high-quality video (and typically audio) data to destination 26. In this case, destination 26 may be a server belonging to a broadcast company, which then distributes the video and audio media to viewers. Additionally or alternatively, bonding device 22 may be connected to a computing device 32, such as laptop, tablet, smartphone, desktop computer or router, for example. As mentioned earlier, destination 26 may transmit downlink data to device 22, in applications, for example, such as high QoS-applications benefitting from such bonding, including video streaming for viewing by one or more end-users connected to the device 22.

To open each cellular channel that it is to use, bonding device 22 (including, as explained above, internal modems and any externally-connected modems, which are the actual physical entities required to present their identities) is generally required to present identity data of the type required by the wireless carrier over which the channel is to be opened. In conventional cellular communication devices, this identity data is contained in a SIM, and bonding device 22 may contain one or more such physical, hardware SIMs for use in opening an initial channel to network 24, as described in greater detail hereinbelow. Alternatively, an external proxy device 38, such as a cellular telephone with a physical SIM and suitable software for interoperation with bonding device 22, may be used to access network 24 and, via the network, a SIM server 34 in order to obtain SIM-related data. Further alternatively, the initial access may be carried out using virtual identity data stored by the bonding device or through a network, such as a LAN, satellite, WLAN, or wireline network, that does not require such identity credentials.

Once an initial channel has been opened to network 24, bonding device 22 uses this channel to access at least one SIM server 34 in order to download one or more virtual identities (also referred to as VSIMs) from a SIM array 36 that is maintained by server 34. Server and client hardware and software for this purpose that are known in the art, such as those offered by Implementa, as noted above in the Background section, may be incorporated into server 34 and bonding device 22 to support these operations. (To access most cellular networks, device 22 will need to access server 34 repeatedly in order to request and receive information from an assigned SIM in array 36.) Typically, bonding device 22 is preconfigured with the network address (such as an Internet Protocol [IP] or HTML-based address) of server 34 or receives the address when it first accesses network 24. Although only a single SIM server and SIM array are shown in the figure, multiple SIM servers and SIM arrays may be deployed at the same or different network locations for reliability and redundancy, ease of access per territory or country, as well as by different network operators, each holding some of the desired VSIMs, or for other reasons. Bonding device 22 may use these virtual identities in establishing additional wireless channels to network 24. Details of these operations are described with reference to the figures that follow.

Figure 2:
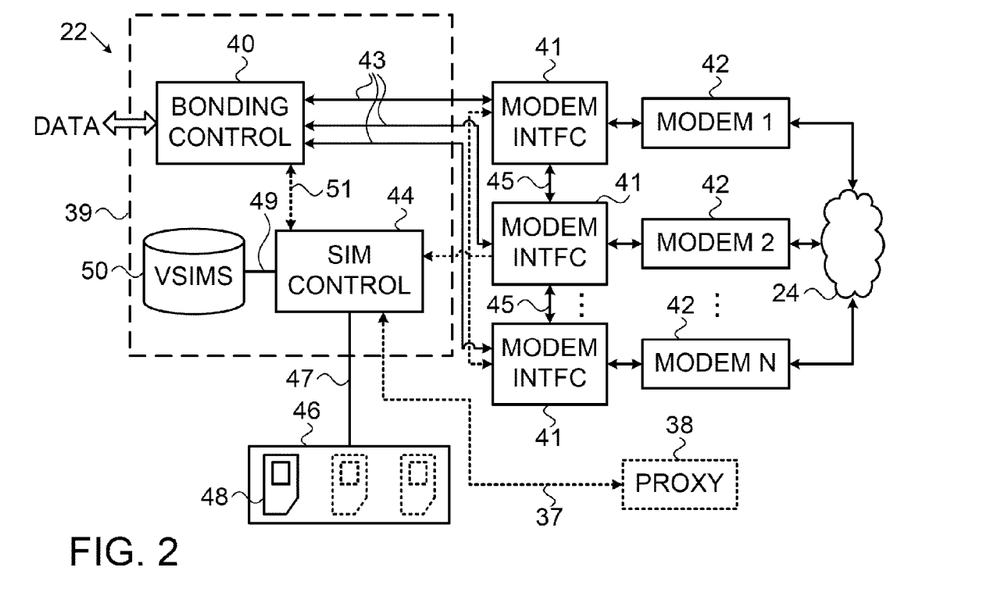
FIG. 2 is a block diagram that schematically shows details of a bonding communication device, in accordance with an embodiment of the present invention.

FIG. 2 is a block diagram that schematically shows details of bonding communication device 22, in accordance with an embodiment of the present invention. This diagram is simplified to show the components of the bonding device that are involved in handling modem identities. Some of the remaining functions of the bonding device may be implemented, for example, in the manner described in the above-mentioned U.S. Pat. No. 7,948,933.

Bonding control logic 40 receives an input data stream, for example from camera 32 or from computing device 33, and distributes the stream via one or more data buses 43 to one or more modem interfaces 41 for multiplexed transmission by multiple wireless modems 42 over network 24. (By the same token, modems 42 may pass incoming data from network 24 to bonding control logic 40 for reassembly into a single output data stream. Furthermore, multiple data devices, such as camera 32 and computing device 33, may be connected and work with bonding device 22 concurrently.) As noted earlier, modems 42 may be configured to operate in accordance with the same or different network technologies, such as GSM, CDMA, and LTE, and are capable of communicating simultaneously over the same or different cellular networks. Optionally, device 22 may comprise or be connected to one or more modems configured for operation on networks of other sorts, such as WLAN, Bluetooth™, satellite networks or wireline-based networks.

Logic 40 monitors transmission conditions and decides which and how many of modems 42 to use for data transmission at any given time. For example, logic 40 may assess the data bandwidth required to carry the multiplexed data stream and may thus decide whether to use only a single modem, when bandwidth requirements are low, or multiple modems. Logic 40 may monitor the network conditions encountered by each of modems 42 in order to decide which modem (or equivalently, which network or networks) to use at any given time. Logic 40 may also report such performance, conditions, desired performance, performance statistics, performance gaps, and other data or preferences to a SIM controller 44 via a control link 51 and receive from it information and instructions.

Bonding control logic 40 and SIM controller 44 (possibly together with ancillary components) are referred to herein collectively as bonding circuitry 39. The functions of logic 40 and controller 44 may be performed by dedicated hardware circuits, or they may be implemented in software on a programmable processor. This latter sort of implementation is appropriate for embodiments in which bonding is performed by existing general-purpose computing and communication devices, such as a smartphone or a tablet, desktop or laptop computer. In this case, bonding circuitry 39 may comprise the existing processor and associate circuits in the computing and communication device.

In general, as explained earlier, modems 42 may require identity data for authentication and encryption on the respective networks over which they communicate. SIM controller 44 may provide this identity data on demand, drawing it via a data connection 47 from an associated SIM array 46 and via a memory bus 49 from a memory configured as a VSIM repository 50. SIM array 46 typically contains at least one physical SIM 48, although SIM-less models of operation are also possible, as explained below. In some embodiments, physical SIM 48 is used essentially, when outside the home network of the physical SIM, for obtaining credentials of one or more of the VSIMS, in order to minimize roaming charges for use of the physical SIM. VSIM repository 50 contains virtual identity data downloaded from SIM server 34. SIM controller 44 thus supplies any number of respective identities, based on either a physical or a virtual SIM, to each modem 42 that is in operation. In this manner, the data stream may be transmitted by bonding control logic 40 among any number of modems with virtual identities, and possibly one or more modems with "physical identities" drawn from physical SIMs 48.

Although SIM array 46 is shown in FIG. 2 as a single unit, SIMs 48 in the array may alternatively be distributed, such that some of the physical SIMs are co-located or otherwise associated with specific modems 42 or are otherwise distributed in any other suitable architecture. Further, the functionality of SIM controller 44 itself may be distributed in whole or in part. For example, the functions of SIM controller 44 may be divided so that they resides on microprocessors in or associated with modem interfaces 41, in order to perform functions such as emulating the corresponding physical SIM by creating credentials using the VSIM identity data, or exchanging credentials and VSIM data with other such distributed or centralized SIM controller functions over a control bus 45.

The virtual identity data supplied by server 34 and stored in repository 50 typically includes the credentials, authentication keys and encryption strings necessary for registration, authentication and subsequent encryption and decryption of communications, and may also include related data, such as APNs, dialing strings, user names and passwords, codes that may be needed to unlock or relock the SIM in question and any other relevant data.

During the start-up or connection processes of bonding device 22, SIM controller 44 typically allocates physical SIM 48 to one of modems 42 in order to establish an initial connection with network 24. The SIM controller may use the modem with SIM 48 to communicate initially with SIM server 34 in order to download one or more virtual identities from the server to VSIM repository 50. SIM array 46 may contain multiple SIMs of different types (physical or VSIMs), operators, networks and other capabilities and attributes, to allow the SIM controller to choose the optimal SIM set for the current desired performance, location and operating conditions of device 22. Alternatively or additionally, in some cases, the user of device 22 may change the SIM or SIMs in array 46 depending, for example, on the country in which the device is currently located. Further alternatively, as noted earlier, SIM controller 44 may communicate via a proxy link 37 with external proxy 38, which typically contains a physical SIM, and runs suitable software for the initial connection with server 34 during startup of bonding device 22, in which case SIM array 46 may not be needed in the bonding device. As yet another option, SIM controller 44 may save a VSIM in repository 50 even when device 22 is powered down or deactivated and may then use this VSIM to establish the initial network connection the next time the bonding device is activated.

In an alternative embodiment, one or more of modems 42 may connect directly to a VSIM service offered by respective cellular operators and may thus obtain one or more VSIMs from the operator. The modem in question may connect directly to the operator's server for this purpose using a dial-in number, access point name (APN), HTML-based access, IP address or any other access method provided by the operator. Several VSIMs may be downloaded in this manner and distributed by modem interfaces 41 via control bus 45 to other modems 42. Alternatively, the user may enter an activation code via a user interface of device 22 (not shown) to initiate this sort of process.

SIM controller 44 and bonding control logic 40 (which are referred to collectively herein as "bonding circuitry") operate in concert to monitor the use of virtual and physical identities in modems 42 and thus to decide which identities should be used at any given time and to add, remove, or replace identities when appropriate. In response to changes in the operational status of bonding device 22, such as desired performance, its location or data load, or the conditions on the networks accessed by the modems, SIM controller 44 may modify the utilization of the virtual identities (VSIMs) among modems 42. In some cases, the SIM controller may choose to download a new virtual identity from server 34 and to load the new virtual identity into at least one of the wireless modems during operation of the bonding device. The VSIM loading and replacement operations in device 22 may be carried out automatically by the bonding circuitry, in a manner that is generally transparent to a user of the device (although these operations may potentially be reflected to the user via a user interface, such as showing data or performance associated with such VSIMs and their networks, and potentially allowing the user to intervene before, during or after such processes). These functions of bonding device 22 are described further hereinbelow with reference to FIG. 3.

Although logic 40 and controller 44 are shown in FIG. 2, for the sake of conceptual clarity, as two separate functional units, in practice the functions of these components of device 22 may be integrated in a single physical unit, such as an integrated circuit chip or circuit board. Alternatively, these functions may be distributed among multiple separate chips and boards, using control link 51 to exchange information and commands between them. In some embodiments, the bonding circuitry in device 22 may comprises a microprocessor, which is programmed in software to carry out the functions that are described herein. This software may be downloaded to device in electronic form, over a network, for example. Additionally or alternatively, the software may be stored on tangible, non-transitory media, such as optical, magnetic, or electronic memory. Further alternatively or additionally, at least some of the functions of the bonding circuitry may be implemented in hard-wired or programmable hardware logic.

Figure 3:
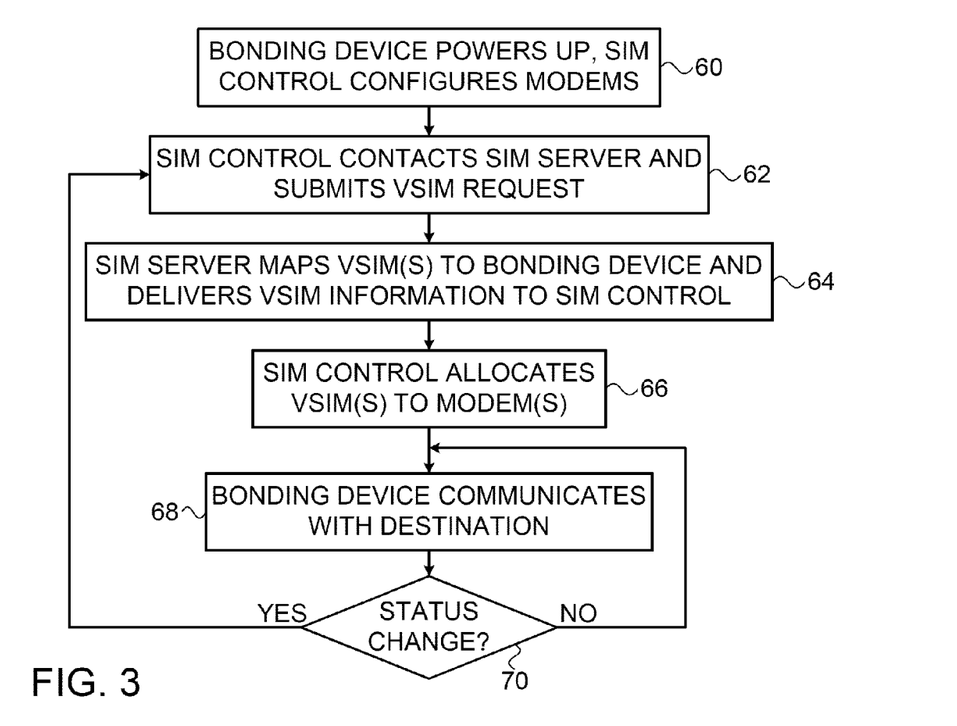
FIG. 3 is a flow chart that schematically illustrates a method for operation of a bonding communication system using virtual identities, in accordance with an embodiment of the present invention.

FIG. 3 is a flow chart that schematically illustrates a method for operation of bonding communication device 22 in system 20, in accordance with an embodiment of the present invention. For the sake of simplicity, this method is described with reference to the system and device configurations that are shown in FIGS. 1 and 2. Alternative embodiments of the present invention, including embodiments that are mentioned herein, provide other designs and modes of operation for a VSIM-based bonding communication device, and the method described below may be adapted, mutatis mutandis, for these alternative embodiments, as well.

Upon power-up of bonding device 22 or during its connection phase or upon other triggers, SIM controller 44 configures modems 42 for operation, at a start-up step 60. Specifically, the SIM controller may run or spawn a software object in the form of a SIM client to receive and handle the identity data for each active modem.

As noted earlier, one of these clients may be associated with physical SIM 48, to enable SIM controller 44 to communicate initially over network 24 with SIM server 34. Thereafter, this SIM client may continue to use the physical SIM identity, particularly if the physical SIM in question belongs to a home carrier in the current location of device 22 and can thus support operation of the corresponding modem without incurring roaming charges. Alternatively, SIM controller 44 may use this physical SIM only briefly, for initial download of one or more VSIMs, and may then replace the physical identity with a virtual identity once a suitable VSIM has been downloaded from the server. Subsequent contact with server 34 will then be through a modem using a VSIM. Two or more modems, possibly served by different carriers, may be used for communication with server 34 in order to ensure that communications with the server are maintained even if one of the modems loses network service or suffers from increased communication or channel latency, so that virtual identity data is received with the lowest possible delay, in order to receive virtual identity data while data communication is already taking place (transmission and/or reception).

SIM controller 44 contacts server 34 to request a change in VSIM allocation, at an identity request step 62. Optionally, controller 44 may contact multiple different servers for this purpose, which may be associated with different network operators. In the initial iteration through step 62, the SIM controller will typically request allocation of one or more VSIMs, but subsequent iterations may involve release and/or exchange of VSIMs that were allocated previously. The request at step 62 typically specifies relevant data such as device parameters, the location of bonding device 22, and possibly one or more preferred carriers, so that server 34 can choose the optimal VSIMs to download from array 36. Location information in this context may be provided in the form of GPS coordinates or in coarser granularity, indicating only the country, area code, and/or cell ID in which device 22 is located. In addition, device 22 may carry out connectivity tests (either autonomously or at the request of server 34 or of the user) in order to determine which cellular networks are available at the current location of the device and with what level of performance and features, and may report this information to server 34, as well. Such scanning and performance monitoring may be done and reported both on startup and periodically at predefined times or in response to triggers, such as changes in experienced or monitored performance.

SIM controller 44 may also specify the number of VSIMs required and any special VSIM properties that may be appropriate. For example, when device 22 needs to transmit with particularly high bandwidth and/or quality of service (QoS), SIM controller 44 may request a "special SIM," which is subject to an enhanced service level agreement (SLA) with a carrier. Typically, cellular network operators charge premium prices for use of such special SIMs, and server 34 will record the cost for billing to the operator of device 22. (Depending on the context in the present description and in the claims, the term "operator" in regard to device 22 may indicate either the actual individual operating the device in the field or an entity, such as a company, on whose behalf, under whose control, and/or at whose expense the device is operated.) Alternatively, SIM controller 44 may be offered a special SIM, which it may approve or reject, possibly subject to user input via the user interface (UI) of device 22.

In response to the VSIM request from device 22, server 34 maps one or more SIMs from its array 36 to device 22, and delivers the virtual identity information associated with these SIMs to SIM controller 44, at an identity delivery step 64. The mapping depends on various factors, starting with the availability of SIMs in array 36 that are active and have not already been allocated to other bonding devices. Beyond this basic limitation, server 34 will generally select SIMs belonging to carriers in the country in which device 22 is located, in order to avoid roaming charges. Thus, the operator of device 22 will benefit from low-cost, high-quality performance in all countries covered by SIMs in array 36 and will be relieved of the need to switch physical SIMs in the device in order to achieve such performance.

Among the available carriers, server 34 may choose those that give the best network performance in the current location of device 22, or those that have the lowest associated costs, or may choose the VSIMs to download based on a combination of these criteria. The "best" performance in this context may depend on matching the types and qualities of services (in terms of factors such as technology, bandwidth, error rate, latency, and fluctuations) offered by different cellular carriers, with the particular needs of the user of device 22, such as real-time transmission or reception or bulk file transfer. Optionally, server 34 may factor into the selection process VSIMs that also best suit the specific hardware characteristics of device 22. The relevant information may be stored in a database according to the device ID sent to server 34 from device 22 or from the full set of data sent to it from device 22. This information may include data such as the antenna configurations and spectrum support of modems 42 in the device. Thus, VSIMs may be chosen in a way that optimizes device performance for user needs, device location, network and performance conditions, and other device characteristics simultaneously. This sort of optimization is carried out in software running on server 34 and/or bonding device 22, without the need for user involvement.

Server 34 and bonding circuitry 39 may select the VSIMs to be allocated to modems 42 based on a wide range of factors, a number of which are mentioned above. More generally, the factors of relevance to the selection of modems may include, for example, device ID; device organization; device capabilities; commercial terms associated with the device, device user or device organization; respective qualities of services experienced by different wireless modems 42; respective qualities of service experienced by different wireless carriers; respective qualities of service monitored by bonding circuitry 39; respective qualities of service expected from or provided by different wireless operators; desired performance; gaps in performance; cost of at least one of the connections, communications, virtual identities or physical identity; capabilities supported by the modems and associated circuitry; marketing criteria; operating criteria; promotional criteria; capabilities supported by networks in the location of bonding device 22; mobility of the bonding device; the current time; current location; applications in use by the bonding device and connected data devices; other devices in that area; performance parameters as seen and provided by the networks; network fraud detection mechanisms; cost and tariffs; data packages; and user input.

In many cases, server 34 will map VSIMs to each bonding device 22 so that different modems 42 in the device access network 24 via different carriers. As a result, transmission by device 22 will be resistant to failures due to congestion, fluctuations or loss of service by a given carrier. Thus, in mapping SIMs to a device, server 34 will generally attempt to diversify the set of carriers, even if one carrier appears to offer better service than the others.

Server 34 may consider the cost and tariffs associated with each SIM, such as costs related to quality of service, to usage volume (e.g., KB/month packages), to operator, to special costs such as special time of day, holidays, etc. These costs may be compared to the current actual status of each SIM, such as its monthly usage status (e.g., KB already consumed), as well as to the terms, agreements and charging policies that may exist with the user of each device 22 or group of such devices put together (forming a "device pool" or "data pool" or "data bank").

It may occur that due to high demand for VSIMs or other reasons, server 34 is unable to provide device 22 with the optimal SIM or set of SIMs from array 36 as and when initially requested by the device. In this case, the server may choose, map and deliver to device 22 a set of SIMs that are less optimal, but still give performance at the desired level or as close as possible to the desired performance level. Later, if more suitable VSIMs become available subsequently, the server may initiate a VSIM swap.

Generally speaking, in requesting VSIMs at step 62, SIM controller 44 may specify a minimum performance level that it requires. In some cases, the SIM controller may request a set of VSIMs having a certain target performance level, and server 34 may offer a larger number of VSIMs than requested, which may exceed the target performance level. In such cases, SIM controller 44 may select the desired VSIMs from the larger number offered by the server. This approach can be used to provide a sort of electronic market for VSIM services.

In addition, when there are a number of bonding devices operating in the same location, server 34 may take the SIM allocations of other devices into account in order to spread traffic approximately evenly among the carriers offering service at this location.

Another factor that server 34 may take into account in mapping SIMs to bonding devices is algorithms that are used by cellular operators to identify fraud, theft and abuse of SIMs, and to block SIMs that appear to have been stolen or hacked. Such algorithms are typically sensitive to utilization patterns in which the current location at which a SIM is used is far away from the last registered location. This sort of pattern may well occur when the same VSIM is used successively by different bonding devices. To avoid blockage of SIMs from array 36, server 34 may choose to reallocate VSIMs to nearby bonding devices or to establish a consistent pattern of VSIM reallocation that will allay algorithmic suspicion.

When server 34 maps a SIM to device 22, it may also initialize an accounting and billing record in connection with the SIM in question. When server 34 subsequently receives charges from the network operators, it may match the charges to the appropriate bonding device and usage. Use of a special VSIM, as noted above, with enhanced QoS, may be subject to billing at a higher rate, and therefore may require explicit approval from the user of device 22 (via the user interface of the device, for example, or other user interface software) before it is downloaded, as a default option or otherwise. The server may also receive utilization information (in terms of connection time and/or data transfer) from SIM controller 44 for use in generating billing records, as well as for tracking and analysis that may be used in subsequent VSIM mapping decisions. Charge accrual with respect to any given VSIM may stop when device 22 releases the VSIM.

After receiving VSIMs from server 34, SIM controller 44 may allocate the VSIMs to the appropriate SIM client instances for use by the corresponding modems 42, at an identity allocation step 66. The SIM controller may allocate all of the received VSIMs, or it may hold one or more in reserve in repository 50 for subsequent allocation as and when needed. The number of VSIMs that are downloaded to and used by device 22 will depend on performance parameters and other relevant factors, as explained above, which may also change over time. For example, SIM controller 44 may initially activate only a single modem for low-resolution transmission of video during an initial surveillance phase. When an event of interest is detected (either automatically or by a human observer) in the surveillance video, however, the SIM controller may immediately allocate VSIMs and activate one or more additional modems in order to transmit the input video at full resolution.

Various sorts of identity information may be distributed at step 66 to modems 42 and/or modem interfaces 41 or may otherwise be applied by bonding controller 40. This identity information may include, for example, the international mobile subscriber identity (IMSI); operator identity; access point name (APN); bandwidth-related information; latency-related information; technology-related information; protocol-related information; error rate; connection user name; connection password; cost information; and network capabilities Once VSIMs have been received and allocated by SIM controller 44, bonding device 22 uses modems 42 to communicate with destination 26, at a communication step 68. The VSIM data may optionally be used in this stage for encrypting and decrypting communications. For example, one or more of the VSIM data fields may be used as an encryption key in a symmetrical encryption scheme, and server 34 may then provide the key to destination 26, as well, for use in decryption. The key may thus change each time a VSIM is replaced in device 22, and data from multiple VSIMs that have been downloaded to device 22 may be combined to create a key that provides even more secure encryption.

SIM controller 44 tracks the status of device 22 and may periodically report status changes to server 34, at a status monitoring step 70. "Status" in this context refers to any or all of the factors that were noted above as being relevant to VSIM mapping and allocation in steps 64 and 66. In response to such a status change, the SIM controller may request a reallocation of VSIMs, which may include adding a new VSIM, relinquishing a VSIM that is no longer needed, or replacing one VSIM with another. Status changes considered at step 70 may relate to conditions including changes in desired performance; connection or disconnection of an external device to or from bonding device 22; a specified status of one of modems 42; a specified connectivity status; encountering a specified performance level or a gap between actual performance and a desired performance level; battery levels; device mobility; network-provided information, such as expected handover start and/or stop; hardware and/or software triggers; associated cost and data package thresholds and status; other devices preemptive considerations; user input; faults; time-related information; and power up and shutdown.

Various criteria may be applied at step 70 to decide whether to change the VSIM allocation. For example, if device 22 moves out of the service area of a given carrier or the carrier experiences congestion or other network problems, so that modems with VSIMs belonging to this carrier lose performance, server 34 may replace these VSIMs with those of another carrier. Movement itself may be a criterion to add one or more VSIMs for possible backup use, since the risk of service loss in this case is increased. As another example, SIM controller 44 may request one or more additional VSIMs upon receiving an instruction (from the user of device 22 or from a remote source) to increase bandwidth, and may relinquish one or more VSIMs in response to an instruction or other conditions that permit a reduction of transmission bandwidth. The SIM controller may, continuously or periodically, compare the data bandwidth that device 22 is consuming to the total bandwidth available via modems 42 that are currently active, and may use this comparison as a criterion to add one or more VSIMs (when the consumed bandwidth is near the total available) or relinquish VSIMs (when there is a large unused bandwidth margin). Alternatively, this function may be carried out by bonding controller 40 on request from SIM controller 44.

Bonding device 22 continues operation in this manner for as long as desired, with VSIM reallocation as needed. When the bonding device is powered down or otherwise deactivated, SIM controller 44 notifies server 34, which returns the allocated SIMs to array 36 for reallocation when needed. Optionally, as noted earlier, device 22 may retain data with respect to one or more of the VSIMs for use at startup upon reactivation.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Communication apparatus, comprising:
an interface to a plurality of physical wireless modems; and
bonding circuitry, which is configured to receive multiple virtual identities, to load respective ones of the received virtual identities into two or more of the physical wireless modems, and to communicate over the air by simultaneously transmitting or receiving a data stream over at least the two or more of the physical wireless modems, wherein the virtual identities are downloaded to the apparatus from at least one pool of heterogeneous virtual identities belonging to at least two different wireless networks, and
wherein the bonding circuitry is configured to select a number and combination of the physical wireless modems and the virtual identities to receive and load into the physical wireless modems responsively to conditions respectively associated with the at least two different wireless connections.

2. The apparatus according to claim 1, and comprising a connection to a physical subscriber identity module (SIM), wherein the bonding circuitry is configured to apply an identity from the physical SIM in one of the physical wireless modems so as to transmit or receive the data stream over the one of the physical wireless modems along with at least one of the physical wireless modems into which the virtual identities have been loaded.

3. The apparatus according to claim 2, wherein the bonding circuitry is configured to communicate initially with at least one server using the one of the physical wireless modems in which the identity from the physical SIM is applied in order to download the virtual identities from the at least one server.

4. The apparatus according to claim 3, wherein the physical SIM is used essentially, when outside a home network of the physical SIM, for obtaining credentials of one or more of the virtual identities.

5. The apparatus according to claim 1, wherein the bonding circuitry is configured to communicate initially with at least one server using an external proxy device in order to download the virtual identities from the at least one server.

6. The apparatus according to claim 1, wherein the virtual identities are associated with two or more different cellular carriers.

7. The apparatus according to claim 1, wherein at least one of the modems is a cellular modem, and at least another of the modems is a satellite modem or is configured for wireless local area network communication.

8. The apparatus according to claim 7, wherein one of the virtual identities is downloaded to the satellite modem.

9. The apparatus according to claim 7, wherein one of the virtual identities is downloaded to the one of the modems that is configured for wireless local area network communication.

10. The apparatus according to claim 1, wherein the virtual identities are selected responsively to at least one factor selected from a group of factors consisting of:
a device ID;
a device configuration;
device capabilities;
a number of the modems in the apparatus;
respective qualities of services experienced by different physical wireless modems;
respective qualities of service experienced by different wireless carriers;
respective qualities of service monitored by the apparatus;
respective qualities of service expected from or provided by different wireless operators;
respective qualities of service associated with at least one of the virtual identities available for selection;
desired performance;
gaps in performance;
a cost of at least one connection;
a cost of at least one communication;
a cost of at least one of the virtual identities;
a cost of at least one physical identity;
a cost associated with at least some of the virtual identities available for selection;
a price, terms and agreements associated with the apparatus;
a price, terms and agreements associated with an operator of the apparatus;
a status of at least one of the virtual identities available for selection;

capabilities supported by the modems and associated circuitry;
a status of other devices;
marketing criteria;
operating criteria;
promotional criteria;
a location of the apparatus;
capabilities supported by networks in the location of the apparatus;
mobility of the apparatus;
a current time;
applications in use by the apparatus; and a user input.

11. The apparatus according to claim 10, wherein the bonding circuitry is configured, in response to a change in one or more of the factors, to modify a utilization of the virtual identities among the physical wireless modems.

12. The apparatus according to claim 11, wherein the bonding circuitry is configured, in response to the change in the one or more of the factors, to download at least one further virtual identity and to load the at least one further virtual identity into at least one of the physical wireless modems.

13. The apparatus according to claim 11, wherein the bonding circuitry is configured, in response to the change in the one or more of the factors, to release at least one of the virtual identities.

14. The apparatus according to claim 1, wherein the virtual identities comprise additional information, selected from a group of information items consisting of:
an international mobile subscriber identity (IMSI);
an operator identity;
an access point name (APN);
bandwidth-related information;
latency-related information;
technology-related information;
an error rate;
a connection user name;
a connection password;
cost information;
usage information; and
network capabilities.

15. The apparatus according to claim 1, wherein the virtual identities are selected so as to optimize a cost-performance criterion of bonded communications by the plurality of the physical wireless modems together.

16. The apparatus according to claim 1, wherein the bonding circuitry is configured to request a first set of the virtual identities from a server, and to receive from the server a second set of the virtual identities, different from the first set, and to load at least one of the virtual identities in the second set into one or more of the physical wireless modems.

17. The apparatus according to claim 1, wherein the bonding circuitry is configured to request the virtual identities from at least two servers, each configured to provide the virtual identities from a different, respective network operator.

18. The apparatus according to claim 1, wherein the bonding circuitry is configured to request from at least one server a set of the virtual identities having a target performance level or a target number of the virtual identities, and to receive from the at least one server an offer of a number of the virtual identities that is different from the requested set or will exceed the target performance level.

19. The apparatus according to claim 18, wherein the bonding circuitry is configured to select the virtual identities to be used by the physical wireless modems from the different number that is offered by the at least one server.

20. The apparatus according to claim 1, wherein the bonding circuitry is configured to request the virtual identities while specifying a minimum performance level of the virtual identities.

21. The apparatus according to claim 1, wherein the received virtual identities are applied by the apparatus in encrypting and decrypting communications.

22. The apparatus according to claim 1, wherein the bonding circuitry is configured to request at least one of the virtual identities automatically upon occurrence of a condition selected from a group of conditions consisting of:
power up;
connection of at least one external device to the apparatus;
disconnection of at least one external device from the apparatus;
a specified status of at least one of the modems;
a specified connectivity status;
specified performance level;
a gap between actual performance and a desired performance level;
a specified utilization level of at least one of the virtual identities;
a specified cost level of at least one of the virtual identities;
a specified level of mobility;
a specified level of a parameter relating to a network condition;
a specified time;
a specified location;
a hardware trigger;
a software trigger;
a user input; and
shutdown.

23. The apparatus according to claim 1, wherein the bonding circuitry is configured to receive at least one of the virtual identities over at least two of the modems.

24. The apparatus according to claim 1, and comprising a connection configured to pass the virtual identities received over one of the modems to at least some of the other modems.

25. The apparatus according to claim 1, wherein the bonding circuitry is configured to replace at least one of the virtual identities that is in use in at least one of the physical wireless modems during operation of the apparatus in communicating over the air.

26. A method for communication, comprising:
providing a bonding device that includes an interface to a plurality of physical wireless modems;
receiving multiple virtual identities from at least one server to the bonding device, wherein the virtual identities are downloaded from at least one pool of heterogeneous virtual identities belonging to at least two different wireless networks;
loading two or more of the received virtual identities respectively into two or more of the physical wireless modems, wherein a number and combination of the physical wireless modems and the virtual identities to receive and load into the physical wireless modems is selected responsively to conditions respectively associated with the at least two different wireless networks; and
communicating over the air by simultaneously using two or more of the virtual identities to transmit or receive a data stream over at least the two or more of the physical wireless modems.

27. A communication system, comprising:
at least one server, configured to maintain and distribute to clients multiple different virtual identities from at least one pool of heterogeneous virtual identities for communicating over at least two different wireless networks; and at least one bonding communication device, which comprises an interface to a plurality of physical wireless modems and is configured to receive two or more virtual identities from the at least one server, to load respective ones of the downloaded virtual identities into at least two of the physical wireless modems, and to communicate over the air by simultaneously using two or more of the virtual identities to transmit or receive a data stream over at least the two or more of the physical wireless modems, wherein the bonding device is configured to select a number and combination of the physical wireless modems and the virtual identities to receive and load into the physical wireless modems responsively to conditions respectively associated with the at least two different wireless networks.

* * * * *